United States Patent [19]
Schaffart et al.

[11] 3,751,070
[45] Aug. 7, 1973

[54] FIFTH WHEEL UNIT

[76] Inventors: Raymond H. Schaffart, Rt. 5, Box 71; Charles V. Otis, Rt. 5, Box 76, both of Rolla, Mo. 65401

[22] Filed: Oct. 29, 1971

[21] Appl. No.: 193,684

[52] U.S. Cl............ 280/432, 280/438 A, 188/72.5, 308/136
[51] Int. Cl............................................ B62d 53/08
[58] Field of Search....................... 280/432, 438 A; 188/72.5, 72.4, 71.2

[56] References Cited
UNITED STATES PATENTS

| | | | |
|---|---|---|---|
| 2,130,004 | 9/1938 | Fusetti............................. | 280/432 |
| 2,188,727 | 1/1940 | Soulis............................... | 280/432 |
| 2,567,312 | 9/1951 | Apgar.............................. | 280/432 |
| 2,711,802 | 6/1955 | Davis............................... | 188/72.5 |
| 2,908,358 | 10/1959 | Erickson.......................... | 188/72.5 |
| 3,007,548 | 11/1961 | Burnett............................ | 188/71.1 |
| 3,063,739 | 11/1962 | Davies............................. | 280/438 A |
| 3,328,051 | 6/1967 | Hope................................ | 280/432 |
| 3,464,719 | 9/1969 | Tantlinger....................... | 280/438 A |

*Primary Examiner*—Leo Friaglia
*Assistant Examiner*—Randall Schrecengost
*Attorney*—Edward A. Boeschenstein et al.

[57] ABSTRACT

A fifth wheel assembly for coupling an over-the-road tractor to a trailer has a skid plate which is carried by a turntable bearing on the tractor so that the skid plate is normally free to rotate relative to the tractor. The skid plate is provided with a retractable locking pin which normally projects into the trailer and prevents the tractor from rotating relative to the skid plate. It is further provided with the usual latch for engaging and retaining the trailer king pin and a release lever for operating that latch. The locking pin is coupled to the release lever and operated thereby so that when the latch is opened, the locking pin is retracted to permit complete disengagement of the tractor from the trailer. A brake mechanism is incorporated into the fifth wheel assembly and includes brake cylinders disposed within the bearing. When expanded, these cylinders bear against the mount for the skid plate and prevent the skid plate from rotating relative to the tractor. The brake cylinders are operated through a valve which opens on manual command to facilitate coupling and also opens when the tractor-trailer combination is involved in a panic stop to prevent jackknifing during the stop.

10 Claims, 7 Drawing Figures

PATENTED AUG 7 1973  3,751,070

PATENTED AUG 7 1973 3,751,070

PATENTED AUG 7 1973     3,751,070

FIFTH WHEEL UNIT

BACKGROUND OF THE INVENTION

This invention relates in general to tractor-trailer combinations and more particularly to a fifth wheel unit for coupling a tractor with a trailer to form such a combination.

In conventional tractor-trailer combinations, the tractor is coupled with the trailer by means of a so-called fifth wheel which is in effect a tiltable skid plate on which the front end of the tractor rests. The actual coupling is effected by the engagement of a king pin on the trailer with a hole and latching device on the tiltable skid plate. The upper surface of the skid plate must be kept well lubricated to enable the tractor to rotate easily with respect to the trailer when turns are negotiated. The lack of adequate lubrication between the fifth wheel and trailer makes cornering difficult and thereby impairs the handling characteristics of the entire combination. Indeed, the complete absence of lubrication can result in the tractor and trailer locking together and being unable to negotiate corners. On the other hand, a properly lubricated skid plate allows the trailer to jackknife in panic stop situations, and this in turn presents a significant hazard to truckers as well as other users of the highway. Moreover, conventional fifth wheel skid plates are mounted on trunnions which extend transversely with respect to the tractor. When the trailer is aligned with the tractor maximum stability is provided at the forward end of the trailer. However, when the tractor is canted with respect to the trailer, as would occur in negotiating a turn, the axis of the trunnions is disposed oblique to the longitudinal axis of the trailer, and by reason of this fact the trailer is less stable and more easily tips. This tendency to tip on occasions makes cornering difficult.

SUMMARY OF THE INVENTION

One of the principal objects of the present invention is to provide a fifth wheel assembly which greatly reduces the tendency of over-the-road tractor-trailer combinations to jackknife in panic stop situations. Another object is to provide a fifth wheel assembly which enhances the handling characteristics of tractor-trailer combinations. A further object is to provide a fifth wheel assembly of the type stated which provides maximum stability for the trailer even when sharp turns are negotiated. Another object is to provide a fifth wheel assembly which enables a trailer to turn easily with respect to a tractor without having a lubricant between the trailer and fifth wheel assembly. These and other objects and advantages will become apparent hereinafter.

The present invention is embodied in a fifth wheel unit including a skid plate and a bearing between the skid plate and the tractor so that the skid plate normally rotates relative to the tractor. Braking means are provided to prevent this rotation in certain situations. The invention also consists in the parts and in the arrangements and combinations of parts hereinafter described and claimed.

DESCRIPTION OF THE DRAWINGS

In the accompanying drawings which form part of the specification and wherein like numerals refer to like parts wherever they occur.

DETAILED DESCRIPTION

Figure 1:
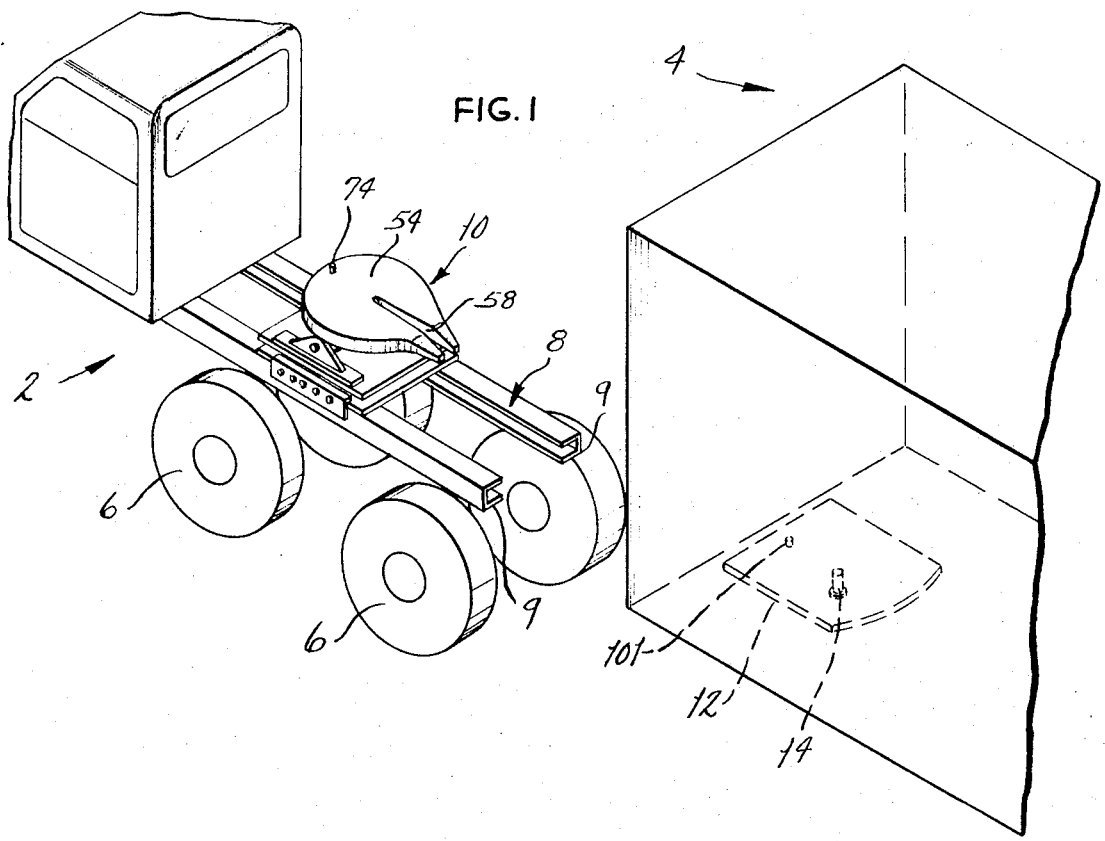
FIG. 1 is a perspective view showing a tractor provided with a fifth wheel unit of the present invention and the trailer to which the tractor is coupled.

Referring now to the drawings, 2 (FIG. 1) designates an over-the-road tractor for towing a trailer 4. The tractor 2 has a set of rear drive wheels 6 which support the rear end of a frame 8 composed of a pair of longitudinal channel-shaped members 9, and mounted on the frame 8 between the rear wheels 6 is a fifth wheel assembly or unit 10 for coupling the trailer 4 to the tractor 2. The trailer 4 has the usual skid plate 12 on its underside, and this skid plate is the portion of the trailer 4 which rests upon the fifth wheel assembly 10 when the tractor 2 and trailer 4 are coupled. In addition, the trailer 4 has a king pin 14 which projects downwardly from the skid plate 12 and into the fifth wheel assembly 10 for connecting the front of the trailer 4 to the tractor 2. Aside from the fifth wheel assembly 10, the foregoing components are conventional to tractor-trailer combinations of current manufacture and will therefore not be discussed in detail.

Figure 2:
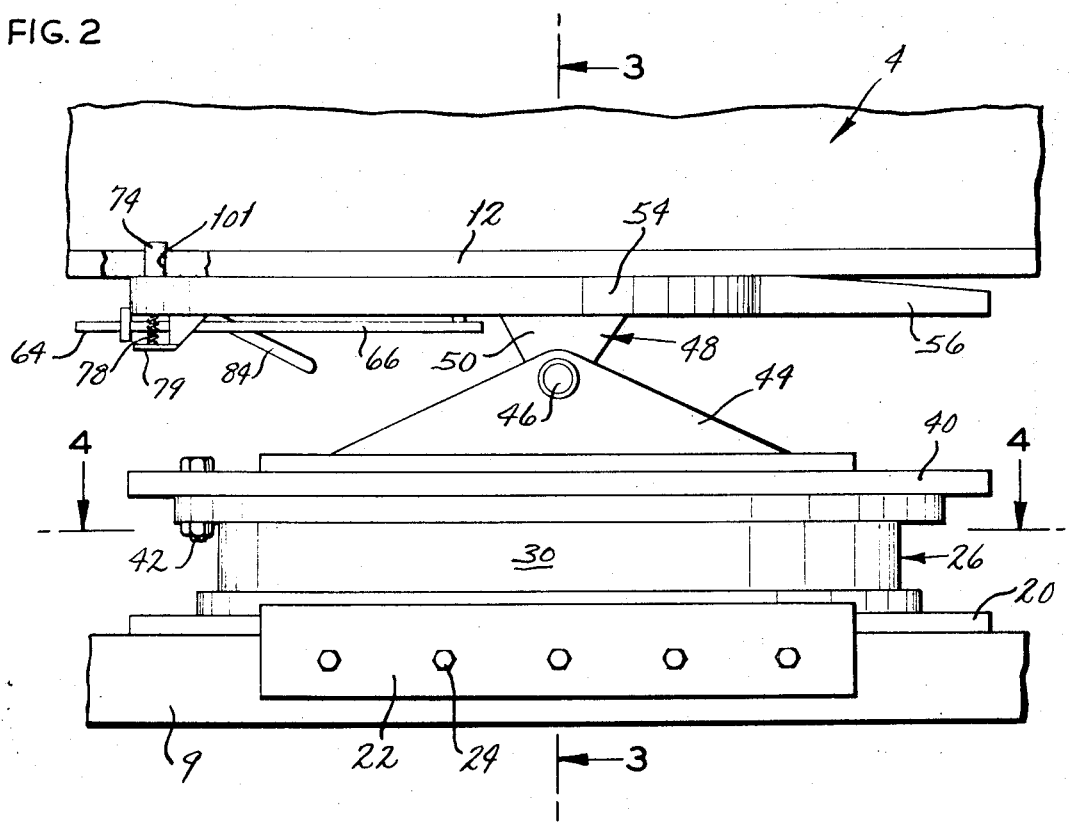
FIG. 2 is a side elevational view of the fifth wheel unit with the front of the trailer resting thereon.

The fifth wheel assembly 10 includes (FIGS. 2 and 3) a base or mounting plate 20 which rests upon the longitudinal channels 9 of the frame 8 generally between the rear wheels 6. Welded to the sides of the base plate 20 are angles 22 having side flanges which project downwardly alongside the laterally presented faces of the longitudinal channels 9. The angles 22 are fastened to the longitudinal channels 9 by bolts 24 so that the base plate 20 is anchored firmly on the truck frame 8.

The base plate 20 supports a turntable bearing 26 (FIGS. 3 and 4) which is capable of accommodating large thrust loads as well as radial loads, and further possesses substantial diameter. The bearing 26 includes an annular inner race 28, an outer race 30 encircling the inner race 28, and a plurality of spherical rolling elements 32 interposed between and engaged with the races 28 and 30. The inner race 28 is secured to the base plate 20 by cap screws 34 which pass through the plate 20 and thread into the inner race 28. The outer race 30 is offset axially a slight distance with respect to the inner race 28 so that its lower surface is disposed slightly above the base plate 20, while its upper surface is presented slightly above the upper surface of the inner race 28. The inner and outer races 28 and 30 have opposed raceways 36 of arcuate cross-sectional shape, and these raceways 36 receive the spherical rolling elements 32. Thus, the rolling elements 32 serves as anti-friction elements and further hold the races 28 and 30 together so that the bearing 26 is unitized. C. E. Ball Radial Turntable bearings manufactured by Kaydon Bearing Division of Keene Corporation, Muskegon, Mich., are ideally suited for use as the turntable bearing 26.

Resting on the outer race 30 is a generally circular upper mounting plate 40 (FIGS. 2 and 3) which is secured thereto by bolts 42. The upper plate 40 extends completely across the top of the bearing 26 so that the interior of the bearing 26 is completely enclosed.

At its sides the upper plate 40 has a pair of trunnion brackets 44 (FIGS. 2 and 3) anchored to it by means of bolts 45, and these brackets 44 possess a triangular configuration and project upwardly. The trunnion brackets 44 receive and confine the ends of a trunnion shaft 46 which extends between them, and the trunnion shaft 46 in turn serves as a journal for a skid plate bracket assembly 48 which is disposed between the trunnion brackets 44 and consists of a pair of triangular side brackets 50 positioned adjacent to the trunnion brackets 44 and a sleeve 52 interconnecting the side brackets 50. Like the trunnion brackets 44, the side brackets 50 are triangular in shape but are inverted with respect thereto. Moreover, the side brackets 50 project upwardly beyond the trunnion brackets 44 where they are welded to the underside of a fifth wheel skid plate 54.

Figure 3:
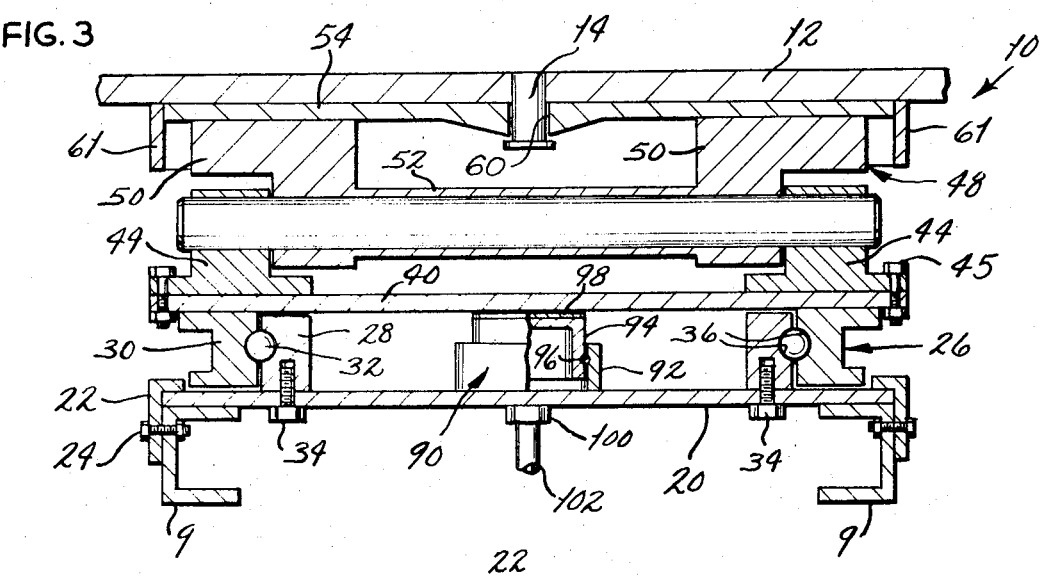
FIG. 3 is a sectional view taken along line 3—3 of FIG. 2.
Figure 4:
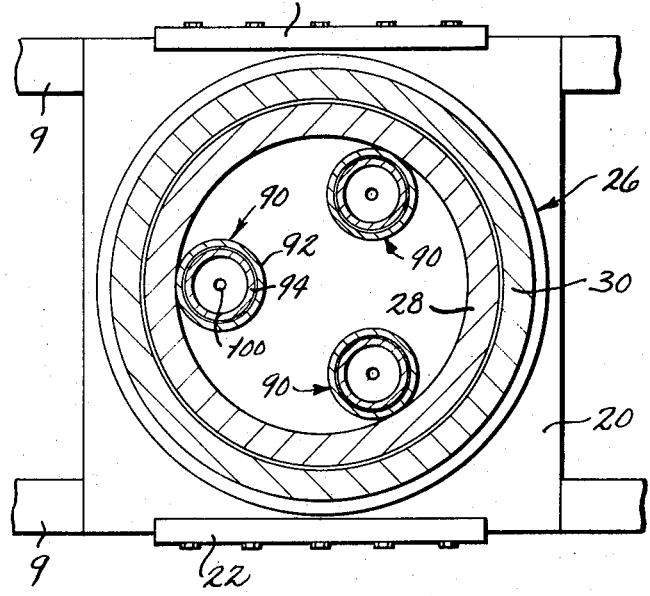
FIG. 4 is a sectional view taken along line 4—4 of FIG. 2.

The fifth wheel skid plate 54 possesses the conventional skid plate configuration (FIG. 5), that is, it for the most part is flat and circular, but along its rearwardly disposed end it is bifurcated and diverted away from the circular shape in the formation of a pair of rear projecting guide lugs 56, the upper surfaces of which are inclined downwardly away from the flat circular portion of the skid plate 54. The opposed inwardly presented surfaces of the lugs 56 diverge away from one another and form the sides of a V-shaped entrance slot 58 which is oriented such that its large end opens rearwardly. The slot 58 leads into the center of the skid plate 54 where it opens into a circular hole 60 sized to accommodate the king pin 14 on the trailer 4. The margins of the skid plate 54, both along the exterior thereof and also along the entrance slot 58 therein, are bounded by a flange 61 (FIG. 3).

The rear end of the circular hole 60 is normally closed by a latch 62 (FIG. 5) to prevent the king pin 14 from leaving the hole 60 through the entrance slot 58. The latch 62 is conventional and pivots about a pin located to the side of the hole 60. It is connected in the usual manner with a release lever 64 (FIGS. 2 and 5) to effect the pivoting. The lever 64 projects forwardly beyond the front of the skid plate 54 and at the flange 61 it is confined to a guide way created by a guide frame 66 attached at its ends to the flange 61. When the release lever 64 is at the inner end of the guide frame 66, the latch 62 closes the back end of the hole 60 so that the king pin 14 is constrained to the hole 60. However, when the lever 64 is pulled laterally toward the outer end of the guide frame 66, the latch 62 moves away from its closed position and opens the rear end of the hole 60 so that the king pin 14 of the trailer 4 may enter or leave the hole 60. The latch 62 and release lever 64 are conventional with Fontaine fifth wheels and will not be described in further detail. Near the outer end of the guide frame 66 the skid palte 54 is provided with a catch (not shown) for holding the release lever in its open position, and that catch is also conventional with Fontaine fifth wheels.

Figure 5:
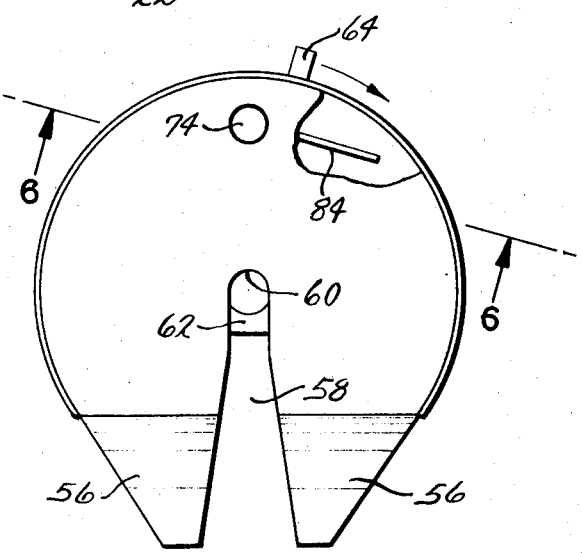
FIG. 5 is a plan view of the fifth wheel assembly.
Figure 6:
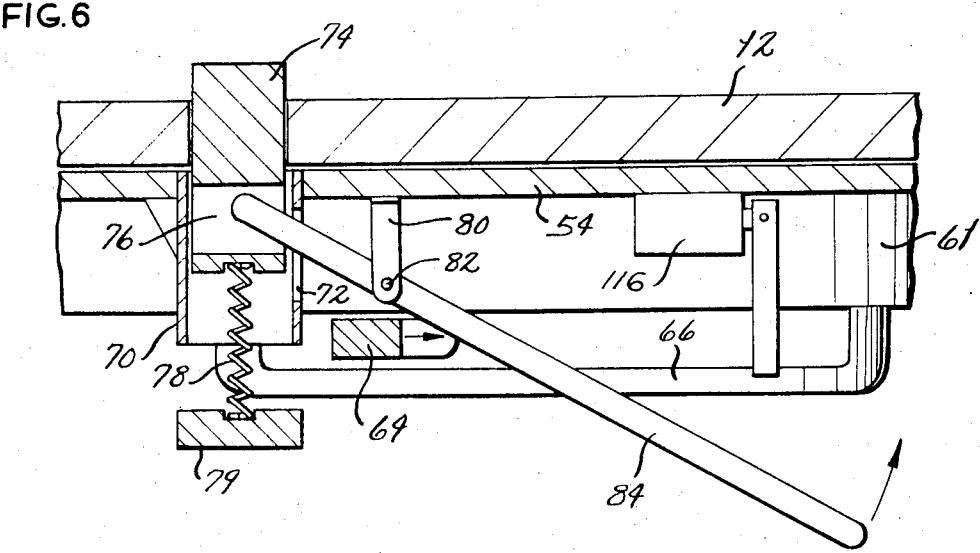
FIG. 6 is a sectional view taken along line 6—6 of FIG. 5 and showing the locking pin for preventing the fifth wheel skid plate from rotating relative to the trailer.

Near its forward end the skid plate 54 is apertured and fitted with a downwardly extending guide tube 70 (FIG. 6) having a vertical slot 72 therein which opens generally to the side to which the guide frame 66 extends. The guide tube 70 contains a locking pin 74 having an axially extending slot 76 therein which aligns with the vertical slot 72. The pin 74 is urged upwardly by a spring 78, the lower end of which is seated against a retainer plate 79 affixed to the underside of the skid plate 54. Also, welded to the underside of the skid plate 54 at the side thereof along which the guide frame 66 extends are downwardly extending brackets 80 connected by a pivot pin 82 which serves as a journal or fulcrum for an operating lever 84. One end of the operating lever 84 projects through the vertical slot 72 in the guide tube and into the aligned axial slot 76 of the locking pin 74, while the outer end projects laterally and when the pin 74 is raised is disposed in the path of the release lever 64 (FIGS. 5 and 6). Thus, when the release lever 64 is pulled laterally to open the latch 62, the operating lever 84 is cammed upwardly. The upward movement of the lever 84 shifts the locking pin 74 from an extended position in which it projects above the upper surface of the skid plate 54 to a retracted position in which it is disposed below that upper surface.

To accommodate the locking pin 74, the trailer skid plate 12 is provided with an aperture 101 (FIG. 2) which is disposed directly ahead of the king pin 14 and aligns with the locking pin 74 when the tractor 2 and trailer 4 are coupled and in direct alignment. Consequently, when the release lever 64 is shifted from its outer to its inner position and no longer restrains the operating lever 84, the spring 78 moves the locking pin 74 upwardly into the aperture 101, and this prevents rotation between the tractor 2 and the trailer 4. The aperture 101 represents the only modification to the trailer 4 to accommodate the fifth wheel assembly 10, and this modification is indeed minor.

Within the interior of the turntable bearing 26, the fifth wheel assembly 10 is provided with three brake cylinders 90 (FIGS. 3 and 4) spaced at equal circumferential intervals, and each brake cylinder 90 includes a fixed barrel 92 welded to the top surface of the base plate 20 and a shiftable tube 94 telescoped into the barrel 92. The shiftable tube 94 carries an O-ring 96 which wipes the inside surface of the barrel 92 to prevent air from leaking from the interior of the cylinder 90. The upper end of the shiftable tube 94 is closed,and riveted or otherwise affixed to this closed end is a brake pad 98 which is presented toward the underside of the upper mounting plate 40. The base plate 20 is further provided with fittings 100 at the brake cylinders 90 for introducing compressed air into the barrels 92 of those cylinders.

Figure 7:
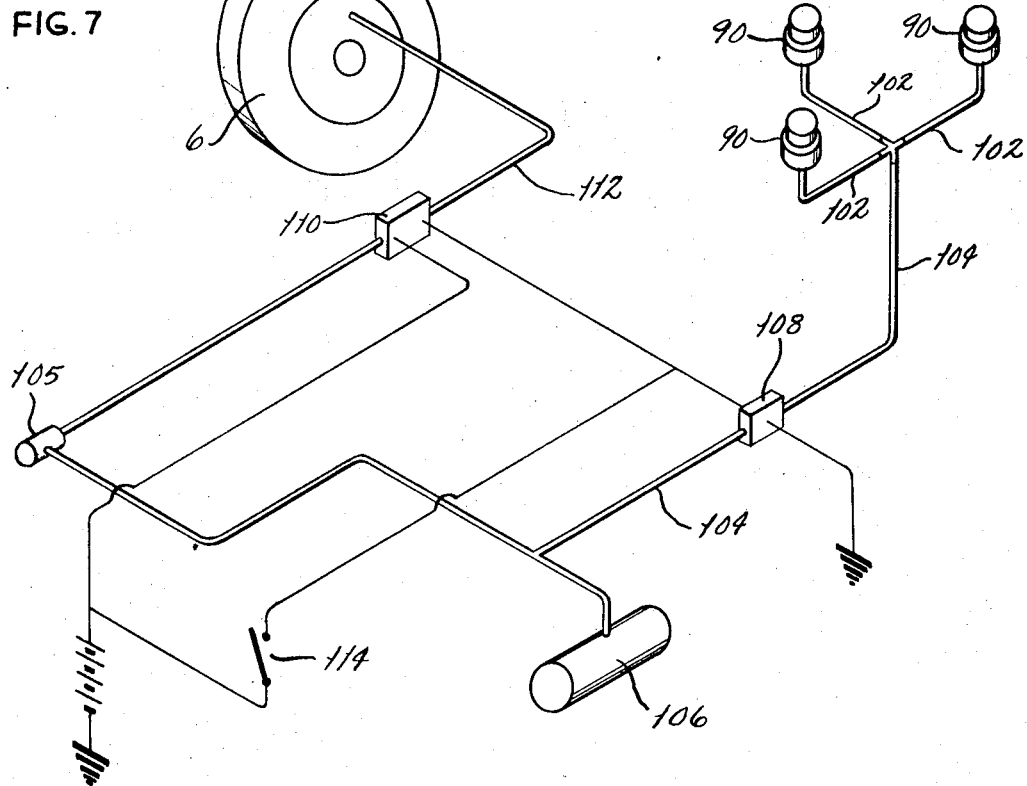
FIG. 7 is a schematic view showing the pneumatic and electrical circuits utilized in the present invention.

Connected with each of the fittings 100 is supply line 102 (FIG. 7) and the three supply lines 102 connect with a common supply line 104 which also forms part of the fifth wheel assembly 10 and leads to compressed air tank 106 of the tractor 2. In this connection, it should be noted that tractors of the type contemplated for use with the fifth wheel assembly 10 are the large over-the-road variety which are universally provided with air brakes. When the brake pedal of such a vehicle is depressed, a valve 105 is opened which allows compressed air from the air tank 106 to flow to the brakes at the wheels 6 of the tractor 2 and also to the brakes at the wheels of the trailer 4. Interposed in the common supply line 104 is a solenoid actuated valve 108, and this valve is operated by pressure sensitive switch 110 disposed in one of the lines 112 leading to the brakes of the wheels 6 on the tractor 2. The switch 110 is set to close the circuit to the solenoid actuated valve 108 when the pressure within the brake line 112 reaches the brake pressure associated with a panic stop situation, which for most tractors is 100 psi. The solenoid-operated valve 108 may also be actuated by an override switch 114 located on the dashboard of the tractor 2. Of course, when either of the switches 110 or 114 is closed, the solenoid valve 108 opens, allowing high pressure air to flow toward the brake cylinders 90 which in turn causes the tubes 94 to move outwardly and force the brake pads 98 against the upper plate 40.

OPERATION

To connect the trailer 4 with the tractor 2 the skid plate 54 on the latter is first rotated manually on the turntable bearing 26 until the V-shaped entrance slot 58 opens directly rearwardly. Thereupon, the override switch 114 is closed and this opens the solenoid switch 108 and allows compressed air from the air tank 106 to enter and expand the brake cylinders 90. Actually, the compressed air from the tank 106 enters within the fixed barrels 92 of the cylinders 90 and this causes the shiftable tubes 94 to move upwardly. After a short distance the tubes 94 force the brake pads 98 against the underside of the upper mounting plate 40 and this locks the upper plate 40 to the base plate 20 so that the fifth wheel skid plate 54 will no longer rotate. The thrust exerted by the pressurized cylinders 90 is resisted by the turntable bearing 26. Next, the release lever 64 is pulled from its centered or inner position laterally to its outer position, and this opens the locking latch 62 at the back of the circular hole 60 so that entrance to that hole 60 is no longer obstructed. As the release lever 64 moves to its outer position, it engages the operating lever 74 and cams the free end thereof upwardly. The opposite end of the operating lever 74, being on the opposite side of the pivot pin 82, moves downwardly and causes the locking pin 74 to retract fully into the skid plate 54. The catch retains the release lever 64 in the outer position, and hence the latch 62 remains open and the pin 74 remains fully retracted.

Once the skid plate 54 is locked and the latch 62 is opened, the tractor 2 is backed toward the trailer 4 in the conventional manner, in which case the skid plate 54 of the fifth wheel assembly 10 will first engage the skid plate 12 of the trailer 4 at the inclined surfaces of the guide lugs 56 on the former. As the skid plate 54 moves along the skid palte 12, it pivots on its trunnion shaft 46 to a horizontal disposition. Moreover, the king pin 14 on the trailer 4 enters the V-shaped entrance slot 58 of the skid plate 54 and is guided toward the circular hole 60 as the fifth wheel skid plate 54 moves along the trailer skid plate 12. When the king pin 14 enters the circular hole 60, the tractor 2 is halted and the override switch 114 is opened. This disconnects the brake cylinders 90 from the compressed air tank 106 so that the brake pads 98 no longer bear against the upper plate 40 with substantial force. Consequently, the skid plate 54 is free to rotate relative to the tractor frame 8. In addition to opening the override switch 114, the catch is released and the release lever 64 is moved to its inner position. This closes the latch 62 at the rear of the hole 60 so as to confine the king pin 14 to the hole 60. As the release lever 64 moves toward its inner position it further moves away from the operating lever 84 for the locking pin 74, and this enables the spring 78 to urge the locking pin 74 upwardly into the aperture 101 in the tractor skid plate 12. The disposition of the locking pin 74 in the aperture 101, of course, prevents the fifth wheel skid plate 54 from rotating relative to the trailer 4.

In negotiating corners the tractor 2, of course, turns relative to the trailer 4, and this relative rotation is accommodated in the turntable bearing 26. In other words, the fifth wheel skid plate 54 does not slip relative to the trailer skid plate 12 inasmuch as the locking pin 74 prevents this. Consequently, the presence of an adequate supply of lubrication between the two skid plates 12 and 54 is not critical, and only a minimal amount of lubrication is needed. In any event, the turntable bearing 26 reduces the resistance to turning considerably in comparison to conventional fifth wheel assemblies so that the trailer 4 does not retard turning of the tractor 2 and the tractor-trailer combination handles exceptionally well on the highway. Moreover, the turntable bearing 26 enables the trunnion shaft 46 to remain perpendicular to the longitudinal axis of the trailer at all times, and this improves the stability of the trailer 4, particularly when sharp turns are negtiated.

The brake cylinders 90 within the fifth wheel assembly 10 normally remain retracted, even when the tractor and trailer brakes are applied, so that the fifth wheel skid plate 54 turns easily with respect to the tractor frame 8. However, when a panic stop situation is encountered full pressure is applied to the air brakes of the tractor 2 and trailer 4, and this pressure is, of course, sensed by the pressure sensitive switch 110 in the brake line 112 leading to one of the tractor brakes. The switch 110 closes and places the solenoid valve 108 across the tractor's battery, thereby opening the valve 108. This in turn places the air tank 106 in communication with the brake cylinders 90 through the lines 102 and 104, and the shiftable tubes 94 expand outwardly from the fixed barrels 92 and force the brake pads 98 against the underside of the upper mounting plate 40. The brake pads 98 bear against the plate 40 with considerable force and prevent the skid plate 54 from rotating relative to the tractor frame 8. The resistance to rotation is substantial and for all practical purposes the skid plate 54 and the base plate 20 are locked together. Consequently, when the wheel brakes of the tractor 2 and trailer 4 are fully applied the trailer 4 is prevented from rotating relative to the tractor 2 and will not jackknife.

To provide surveillance over the fifth wheel assembly 10, a simple lever-type switch 116 is installed in the path of the operating lever 84 and is connected with a light in the cab of the tractor 2 to indicate when the pin 74 is up and hence engaged with the aperture 101 in the skid plate 12 of the trailer 4. Another switch (not shown) should be incorporated into the circuit containing the solenoid valve 108 and that switch should also be connected to a light in the cab of the tractor 2 to indicate when the fifth wheel skid plate 54 is locked against rotation.

This invention is intended to cover all changes and modifications of the example of the invention herein chosen for purposes of the disclosure which do not constitute departures from the spirit and scope of the invention.

What is claimed is:

1. A fifth wheel unit for coupling a trailer having a king pin to a tractor provided with a fluid operated braking system; said fifth wheel unit comprising: a base mounted on the tractor; a bearing having a first race secured to the base, a second race, and rolling elements interposed between the races so that the second race rotates freely with respect to the first race; upper mounting means secured to the second race; a skid plate mounted on the upper mounting means and providing a surface on which the front of the trailer rests; latching means on the skid plate for engaging the king pin and retaining the front of the trailer on the skid plate; a locking pin mounted on the skid plate and being shiftable between retracted and extended positions, the locking pin when in the retracted position being disposed below the trailer supporting surface of the skid plate and when in the extended position projecting above the skid plate to engage the trailer so as to prevent rotation of the trailer relative to the skid plate; means coupling the latching means and the locking pin for retracting the locking pin when the latching means is open; brake means between the base means and the upper mounting means for retarding rotation of the skid plate when applied; and control means responsive to the pressure in the fluid operated braking system for actuating the brake means when pressure within the braking system reaches a predetermined magnitude.

2. A fifth wheel unit for coupling a trailer having a king pin to a tractor, said fifth wheel unit comprising: a base secured to the tractor; a bearing having a hollow interior and including a first race secured to the base, a second race positioned opposite the first race, and rolling elements interposed between the two races to enable the second race to rotate freely relative to the first race; upper mounting means secured to the second race; a skid plate secured to and carried by the upper mounting means and providing an upwardly presented surface on which the front end of the trailer rests, the skid plate having a hole for reception of the trailer king pin and an entrance slot leading from the periphery of the skid plate to the hole; latching means carried by the skid plate and including a latch which normally projects across the entrance slot and closes the hole in the skid plate so that the king pin will not leave the hole, and a release lever for moving the latch away from its closed position; locking means carried by the skid plate and including a retractable locking pin which normally projects upwardly beyond the skid plate and into the trailer to prevent relative rotation between the trailer and the skid plate, the locking means further including operating means for retracting the locking pin completely from the trailer, the operating means being disposed in the path of the release lever so that it is shifted by the release lever and retracts the locking pin when the release lever moves the latch to its open position; and at least one brake cylinder positioned within the hollow interior of the bearing, the cylinder when expanded being engaged with both the base and the upper mounting means to prevent relative rotation between the skid plate and the tractor.

3. A fifth wheel unit according to claim 2 wherein the operating means includes an operating lever engaged with the locking pin for moving the locking pin as it shifts, a portion of the operating lever being disposed in the path of the release lever so that the release lever will engage and shift the operating lever as the release lever moves the latch to its open position; the operating lever when being shifted by the release lever retracting the locking pin.

4. A fifth wheel unit according to claim 3 wherein the operating lever pivots about an axis fixed relative to the skid plate and located intermediate the portion thereof engaged with the locking pin and the portion thereof which is engaged by the release lever.

5. In combination with a tractor having a fluid operated brake system including road wheel brakes, fluid lines leading to the road wheel brakes, and means for increasing the fluid pressure in the fluid lines to actuate the road wheel brakes at both normal and high braking pressures, an improved fifth wheel unit for coupling a trailer having a king pin to the tractor to prevent the trailer from jackknifing, said fifth wheel unit comprising: a base mounted rigidly on the tractor, a skid plate carried by the base and providing an upwardly presented surface on which the front of the trailer rests, the skid plate further having a hole for receiving the king pin of the trailer; a bearing between the base and the skid plate for permitting the skid plate to rotate relative to the base about a vertical axis which is fixed with respect to the base; means for locking the tractor to the skid plate for preventing the trailer from rotating relative to the skid plate; a fifth wheel brake between the base and the skid plate for impeding rotation of the skid plate on base when actuated, the fifth wheel brake being fluid operated and serving to impede rotation only when high pressure fluid is admitted to it; a fifth wheel fluid line interconnecting the brake system of the tractor and the fifth wheel brake; a valve in the fifth wheel fluid line for admitting high pressure fluid from the tractor brake system to the fifth wheel fluid line to actuate the fifth wheel brake; and means for sensing the pressure in the fluid lines leading to the road wheel brakes and for causing the valve to open when the pressure reaches a prescribed magnitude generally coresponding that encountered in panic stop situations, whereby during a panic stop the fifth wheel brake will operate and prevent the trailer form jackknifing.

6. The structure according to claim 5 wherein the means for sensing the pressure in the fluid lines leading to the road wheel brakes includes a pressure sensitive switch in one of the fluid lines leading to the road wheel brakes, and the valve is electrically operated and in series with the pressure sensitive switch.

7. The structure according to claim 5 wherein the locking means includes a pin mounted on the skid plate and movable axially between extended and retracted positions, the pin when in its extended position projecting above the upwardly presented surface of the skid plate and into a hole in the trailer and when in its retracted position being disposed below the upwardly presented surface.

8. The stucture according to claim 7 wherein the skid plate has an entrance slot sized to accommodate the trailer king pin and leading from the periphery of the skid plate to the hole; wherein the skid plate carries latching means for blocking the end of the entrance slot so as to prevent the king pin from leaving the hole by way of the entrance slot, the latching means being retractable from the end of the entrance slot to permit the trailer to be detached from the fifth wheel unit; and wherein operating means for retracting the locking pin is actuated by the latching means and causes the locking pin to retract when the latching means retracts from the end of the entrance slot.

9. A fifth wheel unit for coupling a trailer having a king pin to a tractor; said fifth wheel unit comprising: a base secured firmly to the tractor; a bearing mounted on base with its axis of rotation vertical, the bearing having a hollow interior and including a lower race secured to the base, an upper race rotatable on the lower race, and rolling elements interposed between the two races to enable the upper race to rotate freely on the lower race, the races being inseparable in the axial direction; a mounting member secured to and extended across the upper race of the bearing to close to bearing interior and having a flat surface presented toward the interior of the bearing; a skid plate mounted on the mounting member and providing an upwardly presented surface on which the front end of the trailer rests, the skid plate having an opening which receives the king pin on the trailer; locking means carried by the skid plate for locking the trailer to the skid plate so that the skid plate will not rotate relative to the trailer about the axis of the king pin, the locking means being movable in the vertical direction between an extended position wherein it projects above the surface on the skid plate and will engage the trailer and a retracted position wherein it is disposed below the upwardly presented surface on the skid plate and will be disengaged from the trailer; and at least one brake cylinder within the hollow interior of the bearing and mounted firmly on the base with its axis parallel to but offset from the axis of rotation for the bearing, the cylinder carrying a friction surface which is presented toward the flat surface on the upper mounting member and is driven tightly against the flat surface when high pressure fluid is admitted to the brake cylinder, whereby the brake cylinder will impede rotation of the skid plate and trailer relative to the tractor.

10. A fifth wheel unit according to claim 9 wherein the locking means includes a pin which is oriented with its axis extended vertically and shifts between its extended and retracted positions in the direction of its vertical axis.

* * * * *